(12) United States Patent
Bruck

(10) Patent No.: US 8,746,773 B2
(45) Date of Patent: Jun. 10, 2014

(54) SEAT LATCH ASSEMBLY HAVING MANUAL SEAT DUMP AND POWERED UPRIGHT DESIGN REWIND AND RESET MECHANISM

(71) Applicant: BAE Industries, Inc., Warren, MI (US)

(72) Inventor: Stephen C. Bruck, Howell, MI (US)

(73) Assignee: BAE Industries, Inc., Warren, MI (US)

( * ) Notice: Subject to any disclaimer, the term of this patent is extended or adjusted under 35 U.S.C. 154(b) by 0 days.

(21) Appl. No.: 14/021,440

(22) Filed: Sep. 9, 2013

(65) Prior Publication Data

US 2014/0062157 A1 Mar. 6, 2014

Related U.S. Application Data

(63) Continuation-in-part of application No. 13/773,207, filed on Feb. 21, 2013.

(60) Provisional application No. 61/696,411, filed on Sep. 4, 2012.

(51) Int. Cl.
*B60N 2/20* (2006.01)
*B60N 2/23* (2006.01)

(52) U.S. Cl.
USPC .................. 296/65.17; 296/65.16; 296/65.18

(58) Field of Classification Search
CPC ............ B60N 2/32; B60N 2/20; B60N 2/233; B60N 2/23
USPC ........................................... 296/65.16–65.18
See application file for complete search history.

(56) References Cited

U.S. PATENT DOCUMENTS

| 6,612,653 | B2 | 9/2003 | Takata |
| 6,655,741 | B2 | 12/2003 | Bonk |
| 6,726,283 | B2 | 4/2004 | Schambre et al. |
| 6,764,136 | B2 | 7/2004 | Sakamoto |
| 6,971,720 | B2 | 12/2005 | Bonk |
| 7,188,904 | B2 | 3/2007 | Bruck et al. |
| 7,775,594 | B2 | 8/2010 | Bruck et al. |
| 8,226,167 | B2 | 7/2012 | Bruck et al. |
| 2003/0189371 | A1 | 10/2003 | Collins |
| 2006/0131946 | A1 | 6/2006 | Andrigo et al. |
| 2009/0322137 | A1 | 12/2009 | Kojima et al. |

FOREIGN PATENT DOCUMENTS

| JP | 2007083777 A | 4/2007 |
| JP | 4963595 B2 | 6/2012 |
| WO | 2006095108 A1 | 9/2006 |

*Primary Examiner* — Dennis H Pedder
*Assistant Examiner* — Beverly Becker
(74) *Attorney, Agent, or Firm* — Gifford, Krass, Sprinkle, Anderson & Citkowski, P.C.; Douglas J. McEvoy

(57) ABSTRACT

A seat latch assembly for providing manual triggering and subsequent powered rewinding of a seatback. A stanchion support is secured to a floor location of a vehicle frame. A seatback sector is pivotally supported at a lower end to an upper location of the stanchion. The sector engages along a side location of a frame forming a portion of the seatback in a first upper design position. A lever and trigger initiates forward rotating dump of the seatback. A plurality of four linkage members are also located upon the stanchion and, in combination with a motor, provide upright rewinding of the seatback and subsequent resetting of the linkage mechanism.

20 Claims, 16 Drawing Sheets

SEAT LATCH ASSEMBLY HAVING MANUAL SEAT DUMP AND POWERED UPRIGHT DESIGN REWIND AND RESET MECHANISM

CROSS-REFERENCE TO RELATED APPLICATIONS

This Application is a Continuation-in-part of application Ser. No. 13/773,207 filed on Feb. 21, 2013. Application Ser. No. 13/773,207 claims the benefit of U.S. Provisional Application 61/696,411 filed on Sep. 4, 2012.

FIELD OF THE INVENTION

The present application relates generally to a vehicle seat dump and return mechanism. More specifically, the present invention discloses a seat latch assembly incorporating a manual triggered forward dump of the seatback, with powered reversed/upright rewind for returning the seat back to the upright design position. The motor rewind function further integrates a sensor which is tripped upon detecting an obstruction in the path of the upwardly actuating seatback and which responds by back driving the motor to return the seat to the folded/dump position.

DESCRIPTION OF THE BACKGROUND ART

The prior art is documented with examples of seat latch assemblies for providing forward seat back dump and reverse retraction to an upright design position. Representative examples of such assemblies include each of the powered seat assembly with motor depicted in U.S. Pat. No. 7,188,904, the power seat assembly with motor actuated spring release and seatback rewind of U.S. Pat. No. 7,775,594, and the linear recliner seat assembly with threaded linear drive rod and rotatably engaged gear stop of U.S. Pat. No. 8,226,167, all issued to Bruck et al.

SUMMARY OF THE INVENTION

The present invention discloses a seat latch assembly for providing manual triggering and subsequent powered rewinding of a seatback. A vertical support stanchion is secured to a floor location of a vehicle frame. An arm is pivotally supported at a lower end to an upper location of the stanchion. The arm engages along a side location of a frame forming a portion of the seatback in a first upper design position.

A puck recliner package is incorporated on an inboard side location of the stanchion and coordinates with a lever subassembly in pivotal contact with the upright arm for triggering initial forward rotating dump of the seatback. A linkage subassembly is located upon an outboard side of the stanchion for providing upright rewinding and resetting of the seatback.

The linkage subassembly includes pivotally interconnecting linkage members extending between the arm and a motor drive associated with lowermost pivotal mounting location of the stanchion support. In one variant, a first linkage member exhibits a substantially "L" curved profile and is pivotally supported to an intermediate location of the stanchion between the pivotal mounting locations of the (upper) seatback arm and (lower) motor mount. A second linear linkage member is pivotally inter-engaged at a lower end to an end of the "L" shaped linkage member and at an upper end is secured in a combined pivotal and sliding manner within an actuate channel configured within a lower end of the of the arm coaxial with its pivot point.

A further and pseudo triangular shaped linkage member is pivotally mounted at a lower corner to a further location of the stanchion and is configured such that it is mounted in a sufficiently spaced fashion from the vertical support. An upwardly and rearwardly angled portion of the pseudo triangular shaped linkage member extends from the pivotal supporting location and overlaps an edge contoured surface of the first linkage member. A pin extends inwardly and proximate an end location, such that the pin abuts against the contoured surface of the first linkage member.

An electric motor assembly is mounted to a lower end location of the stanchion support proximate its angled bottom. The motor includes an elongated and rotatably driven threaded shaft over which is seated an interiorly threaded collar, a pin extending from an inner facing side of the collar and pivotally securing to a further upper/rear corner of the pseudo triangular shaped linkage member. An obstruction sensor is incorporated into the motor for reversing a driving direction, such as in the event of an obstruction being detected during resetting to the upright design position.

Upon triggered forward dump of the seatback, the motor drive shaft is rotated in a first direction, causing the collar to descend inwardly along the shaft and in order to influence the interconnecting linkage members to upwardly reset the seatback to the design position. The threaded motor shaft is then driven in a reverse direction, causing the collar to travel in a reverse/outward direction along the shaft and the linkage members to reset to their original position.

In another variant, the linkage is reconfigured to include a sector coaxially mounted over the arm. A pin is mounted at a pivotally offset location of the sector and, upon the arm being rotated to the forward dump position, engages an outer edge located shoulder projection of the arm. Additional linkage members interconnect an extending end of the sector offset from its pivot location with a nut drive supported upon an end of the threaded drive shaft of the electric motor.

Upon actuating the threaded drive shaft in a first direction, in which the nut drive is causes to descend inwardly along the shaft, the configuration of the linkages causes the sector to pivot in a first direction, with the pin acting upon the shoulder edge projection of the arm and in order to rewind the arm (and seatback) to the upright design position, where it reengages the inboard located puck recliner package. The motor assembly subsequently reverses the rotational direction of the threaded shaft, causing the nut drive to travel in a reverse/outward direction along the shaft in order to reset the linkage to the original upright design position.

In a yet further variant, the linkage subassembly is reconfigured in pivotally interconnecting fashion between the arm and the motor drive associated with lowermost pivotal mounting location of the stanchion support. A triangular shaped linkage member is mounted at an intermediate location of the stanchion support via a pin or rivet secured through a first corner location. A second corner location of the triangular shaped linkage member receives the pin extending from the inner facing side of the traversable and interiorly threaded collar associated with the rotatably driven motor shaft.

A second linkage member exhibits a generally elongate profile and is pivotally mounted to the stanchion support at a location underneath and obscured by the triangular shaped member, with a portion of the second linkage member projecting above a third corner profile of the triangular shaped member. The second linkage member exhibits a widened and partial slot defining interior aperture overlapped by the third corner profile of the triangular shaped linkage member. A pivotal range of motion associated with the second member, upon being exerted by the motor and inter-connected first member, is established between a first stanchion engaged stop pin abutting the second member at an upright design position of the associated seatback arm, and a second stop pin abutting the second member at an end cycle location of a pivoting/upright rewinding of the seatback arm.

A third elongated linkage member is pivotally and rotatably interconnected to an uppermost projecting location of the second member, such as by a further rivet or pin. The profile of the third elongated member is such that it exhibits first and second reverse arcuate portions, this in order to avoid contacting the first stop pin during the seat back rewind and linkage reset positions.

An upper most and generally triangular shaped sector defines a fourth linkage member and which is coaxially pivotal relative to the seatback sector via a pin or rivet extending through the seatback sector and a first corner location of the fourth member. The third elongate member links to the fourth member via a further pin or rivet that inter-pivotally engages a second corner location of the fourth member to an upper end proximate location of the third member.

A further stop/drive pin projects outwardly from a third and generally lower most corner location of the fourth member located below an arcuate bottom edge profile of the seatback sector and such that, in a first triggered forward dumping rotation of the seatback, the pin defines a forward most permitted angular rotation of the seatback upon being abutted by a projecting shoulder portion of the seatback sector associated with a location of its arcuate bottom profile. The pin then subsequently functions in a driving/rewind capacity against the projecting ledge or shoulder of the seatback sector, upon the motor drive shaft being rotated in the first upright rewind cycle, this again causing the collar to descend inwardly along the shaft and in order to influence the interconnecting linkage members to upwardly reset the seatback to the design position. Consistent with the previously described variants, the threaded motor shaft is then driven in a reverse direction, causing the collar to travel in a reverse/outward direction along the shaft and the linkage members to reset to their original position.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
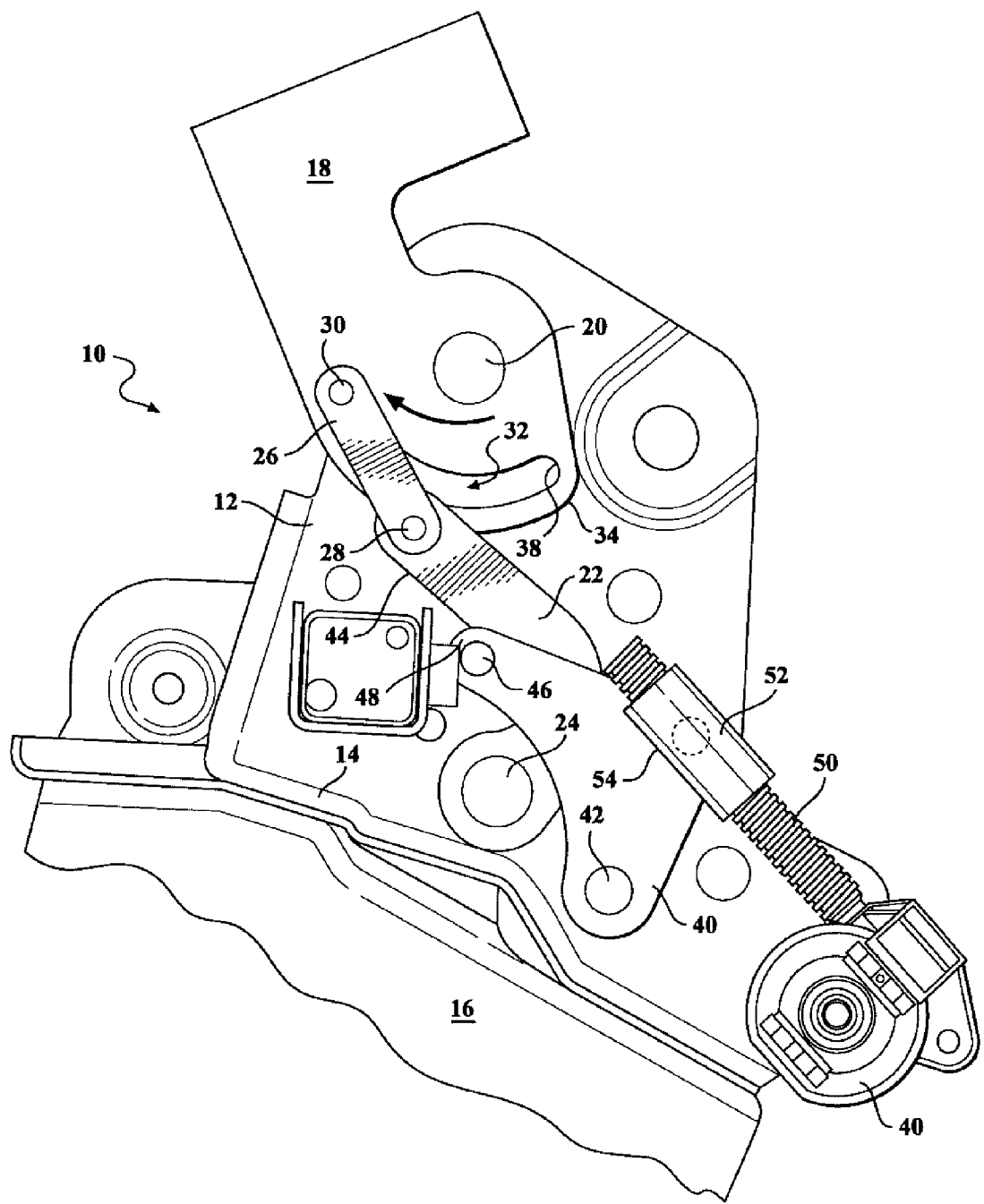
FIG. 1 is a first plan view of the latch mechanism secured to a frame location of a vehicle and exhibiting a pivotally associated seatback engaged member in an upright design position.
Figure 2:
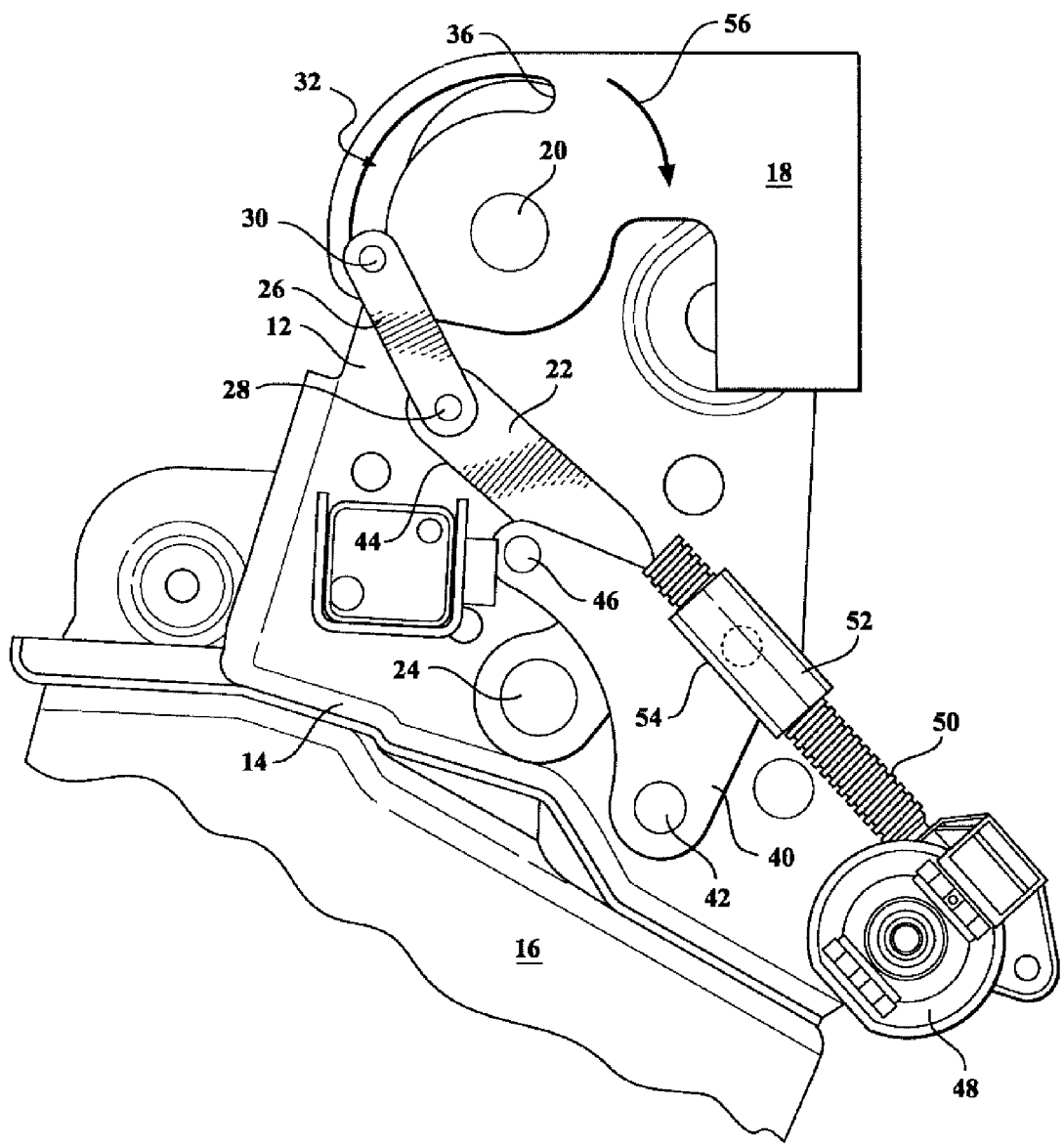
FIG. 2 is a succeeding illustration of the seatback in a manually triggered and forward dump position.
Figure 3:
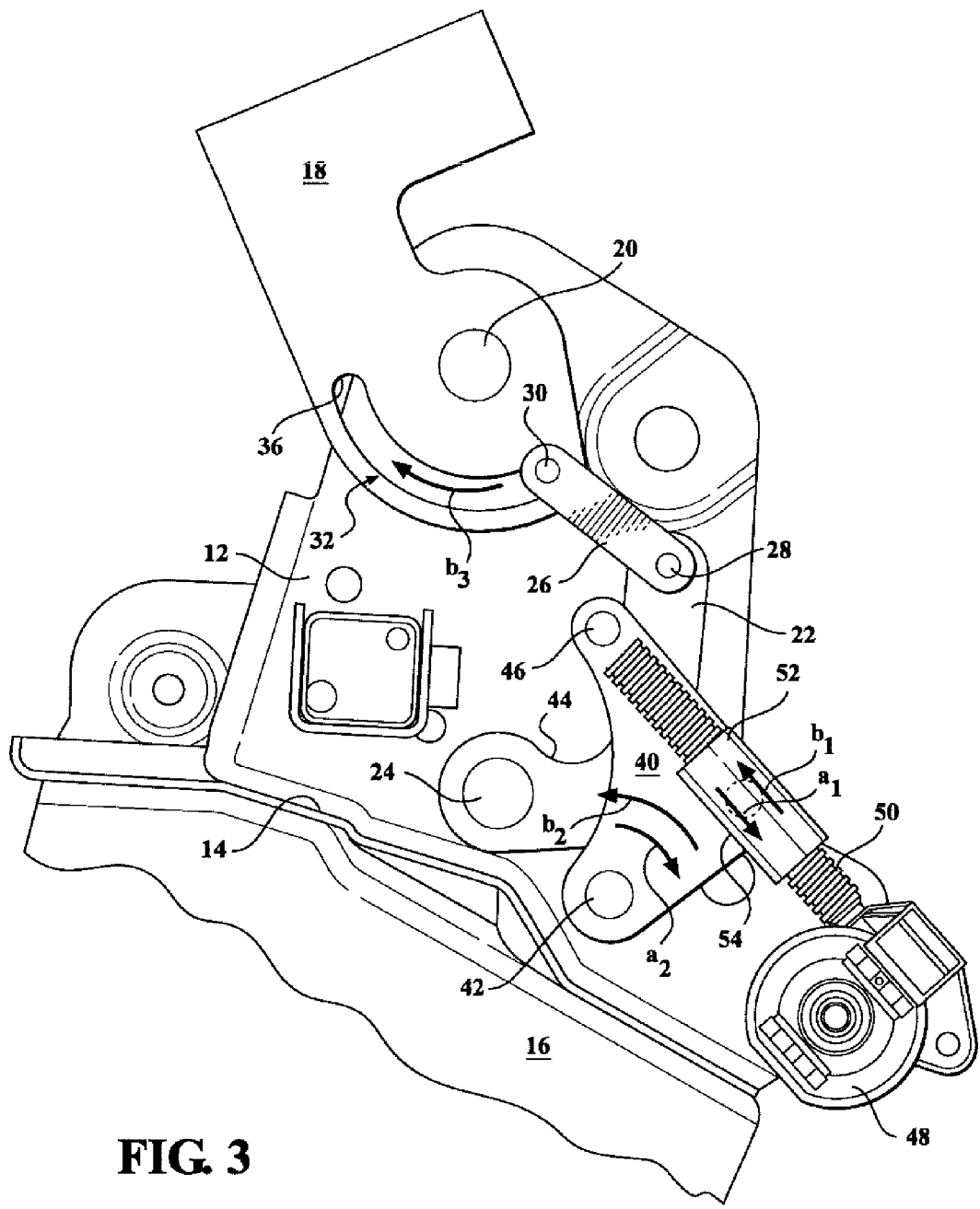
FIG. 3 is a further succeeding illustration of a motor rewind mechanism for returning the seatback to the upright design position, following which the articulating drive linkage interconnecting the motor to the seatback engaged member is retracted to the initial upright design position.

With reference to FIGS. 1-3, the present invention discloses a seat latch assembly exhibiting a manual triggered forward seat dump in combination with a motorized reverse/upright rewind mechanism for returning the seat to an upright design position. As will be further described, the motor rewind function further integrates a sensor which, upon being tripped if it detects an obstruction in the path of the upwardly actuating seatback, back drives the motor to return the seat to the folded/dump position.

FIG. 1 is a first plan view of the latch mechanism, generally at 10, in which a base component exhibits a vertical support 12, with an angled bottom 14 affixing to a floor location of a vehicle frame 16. An upright component 18 is generally depicted in plan view which exhibits a substantially planar mounting surface pivotally secured to an elevated location of the support 12 via a pivot support pin or rivet 20. An exposed side surface of the upright component 18 affixes to a side location of a vehicle seatback (not shown) via bolts or other fasteners (also not shown), and so that the seatback is likewise pivotally supported about the pin 20.

A pair of inter-engaging linkage subassemblies are associated with the latch and include a first subassembly having a first linkage member 22 exhibiting a flattened shape in cross section and with a substantially "L" curved profile. A shortened base portion of the linkage member 22 pivotally secures to a lower location of the vertical support 12 via a further pin or rivet 24.

A second linear linkage member 26 pivotally engages at a first end 28 to an overlapping and elongate extending end of the first linkage member 22, the linkage member 26 further connecting in a combined pivotal and translational fashion at a second end 30 within an arcuate channel 32 (defined by enclosed inner perimeter boundary) which is configured proximate a lower edge 34 of the vertical support 12. The connecting end 30 of the second linkage member 26 is depicted in the upright position of FIG. 1 in contact with a first end 36 (as revealed in FIG. 2 following translation of the linkage connection 30) of the arcuate channel 32 and, as will be further described, translates to a second opposite end 38 (evident in FIG. 1 prior to initial translation of the linkage 26) upon forward dump of the seatback, and with subsequent motor rewind returning the linkage connection 30 to the first end 36.

A second and overlapping linkage subassembly includes a pseudo-triangular shaped linkage member 40 pivotally connected, such as by a rivet or pin, at a lower corner location 42 of the linkage member 40, which is supported at a lowest location of the vertical support 12. The linkage member 40 is mounted in a sufficiently spaced fashion from the support 12 such that an upwardly and rearwardly angled portion extending from the pivot location 42 overlaps an edge contoured surface 44 of the linkage member 22, a pin 46 extending inwardly and proximate an end location 48 of the linkage member 40 such that the pin 46 abuts against the contoured surface 44 of the linkage member 22.

An electric motor assembly 48 is provided and mounts to a lower end location of the support 12 proximate its angled bottom 14. The motor includes an elongated and rotatably driven threaded shaft 50, over which is seated an interiorly threaded collar 52. Although not evident from the plan views of FIGS. 1-3, a further pin or rivet extends from an inner facing side of the collar 52 and pivotally secures to a further upper/rear corner 54 of the pseudo triangular shaped linkage member 40.

Given the above description, the upright component 18 is initially depicted at an angular orientation in FIG. 1 consistent with an upright design position of the engaged seat back. Proceeding to FIG. 2, the seatback in a manually triggered by additional latch components (not shown) and so that the seatback is rotated to a forward dump position. The additional latch structure not shown can also include a main clock or drive spring which influences the upright component 18 in a clockwise direction (see arrow 56) concurrent with the pivotal end connection 30 of the linkage member 26 translating along the arcuate pathway of the channel 32 from the first end 36 to the second end 38, the linkage connection along the arcuate pathway defining the range of rotation of the upright component 18 between the design position of FIG. 1 and the forward dump position of FIG. 2.

Referring to FIG. 3, a further succeeding illustration of a motor rewind mechanism is shown for returning the seatback engaging upright component 18 to the upright design position of FIG. 1. This is initiated by the motor 48 rotating the threaded shaft 50 in a given direction such that the outer supported collar 52 is caused to linearly translate along the shaft in a direction a1.

Actuation causes the pseudo triangular shaped linkage 40 to pivot along arrow a2 about its pin 42, such that the inner extending pin 46 drives the underside located linkage 22 about its pivot 24, and by virtue of the pin 46 abutting and traveling along the edge contoured surface 44 of the linkage 22. In this manner, the upright component 18 is reverse pivoted upwardly to the design position by the pivotal end connection 30 of the linkage 26 pulling against the second arcuate end 38 of the channel 36.

Although not shown, an obstruction sensor is built into the motor construction and, in the event that an obstruction is detected as a result of the seatback exerting a resistance to the rewind action, the motor 48 automatically reverses direction (see arrow b1) thus returning the linkage members 40 and 22 to the triggered dump position of FIG. 2. Otherwise, and upon the upright member 18 and affixed seatback being successively rewound upwardly to the position depicted in each of FIGS. 1 and 3, the motor 48 then triggers the reverse direction drive b1 of the collar and that (again at b2) of the pseudo triangular linkage 40.

Due to the counterclockwise (ccw) bias associated with a clock spring or the like mounted about the pivot pin connection 24 of the linkage 22, the reverse/unseating direction of the abutting pin 46 results in the linkage 22 reverting to its ccw spring bias and driving the linkage 26, along its end connection 30, in an arcuate translating direction b3 so that it resets against the first arcuate end 36 (FIG. 1), at which point the linkage has been completely reset to the design position of FIG. 1, and until a subsequent seat dump triggering action is initiated.

Figure 4:
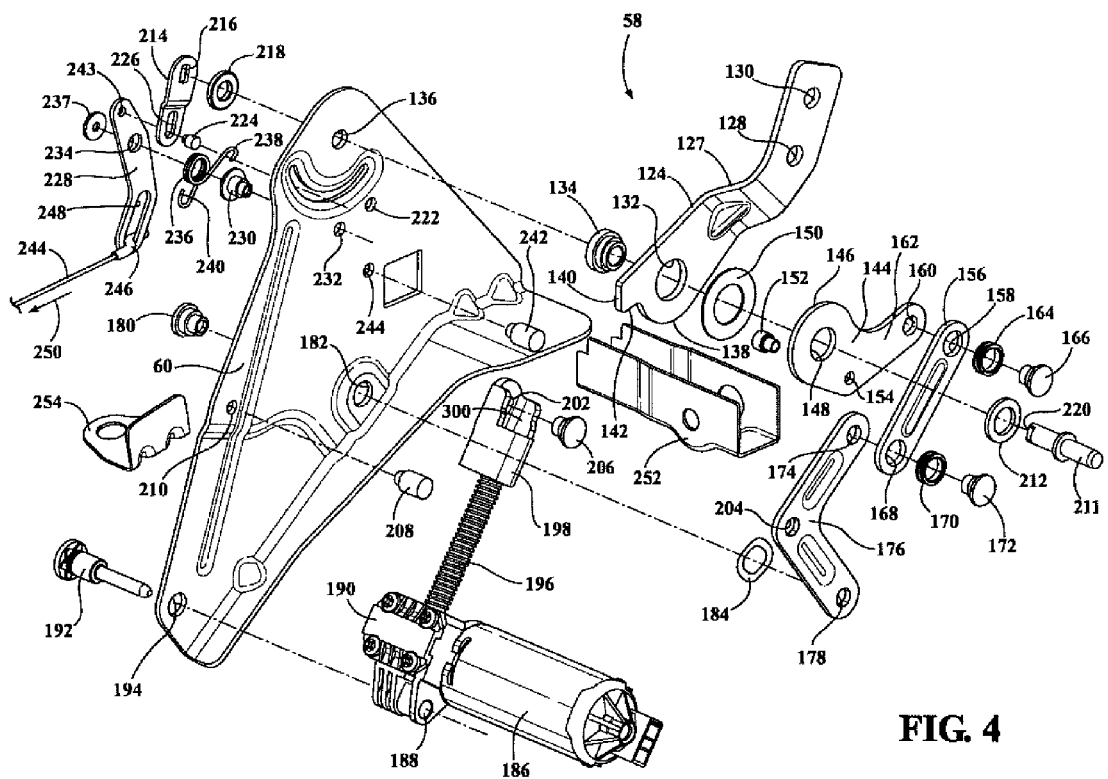
FIG. 4 is an exploded view of a second embodiment of the latch mechanism incorporating an alternate arrangement of linkages for facilitating manual forward dump and powered rewind/reset of the associated seat back.

Referring now to FIG. 4, an exploded view is generally shown at 58, of a second embodiment of the latch mechanism incorporating an alternate arrangement of linkages for facilitating manual forward dump and powered rewind/reset of the associated seat back. With concurrent reference to plan views of FIGS. 5-7, a vertical stanchion support 60 is shown and such as may form a portion of an outboard frame support of a 60/40 seat assembly.

Figure 12:
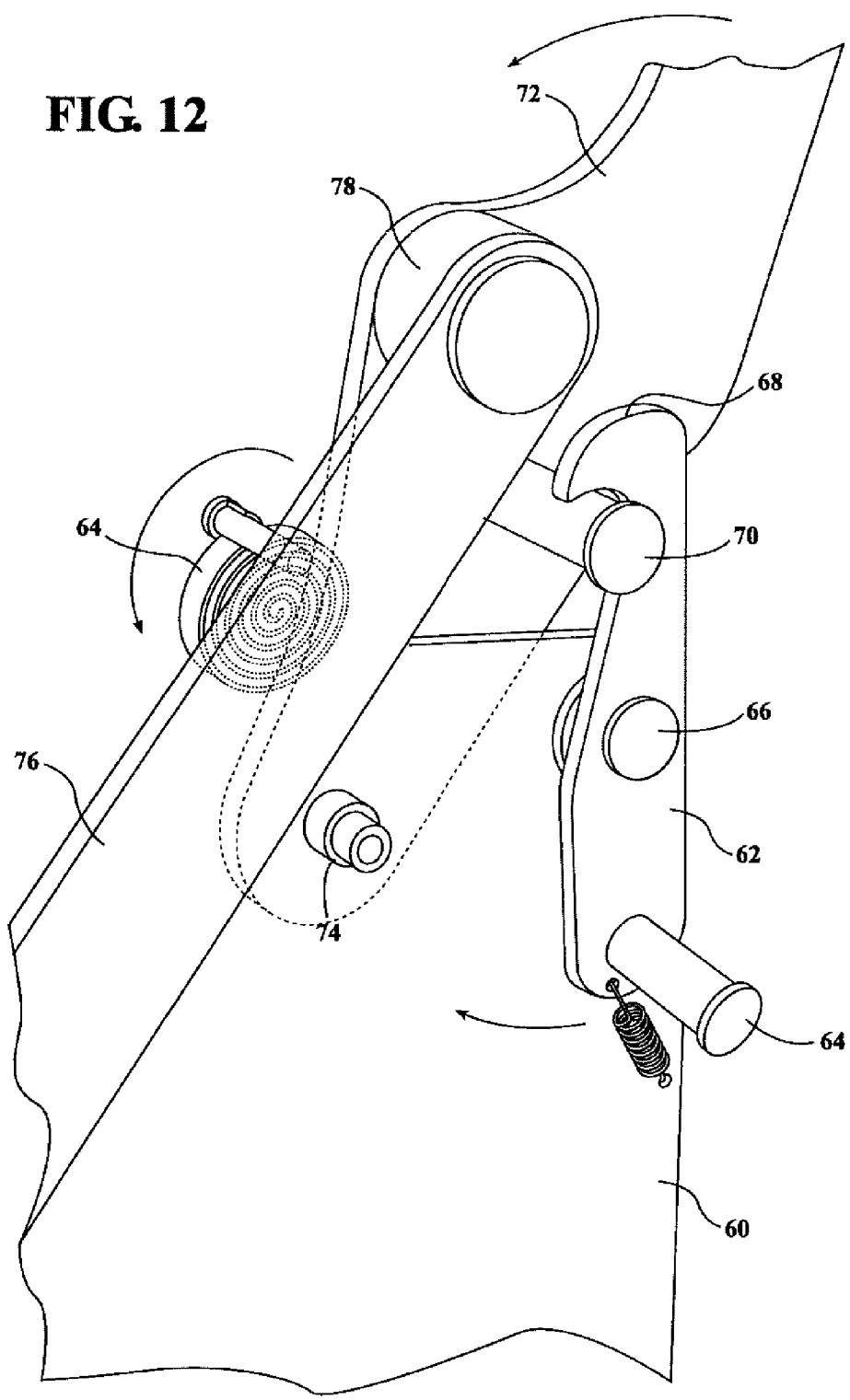
FIG. 12 is a reverse face illustration of a single stanchion release and rewind mechanism according to a yet further embodiment depicting the release lever and manual dump clock spring, and with the rewind linkage being hidden from view.

As will be described in additional detail with reference to the subsequent illustrations, the dump and rewind seat back linkage supporting mechanism 58 can contemplate in one variant being integrated into a single stanchion support 60, such stanchion also including a latch 62 and clock spring 64 secured the stanchion 60 as particularly shown in FIG. 12 and which further operates with a second inboard spaced and free pivoting (dummy) stanchion which may form a portion of the underneath frame construction of the seat. Upon triggering a pin 64 of the latch 62 a spaced distance from its pivot mounting location 66 to the stanchion, this results in a remote hook end 68 of the latch unseating from a further pin 70 extending from an inboard side of the seatback arm 72, whereupon the clock spring 64 biases a seatback arm 72 to a forward dump position about a lower located pivot 74 engaging the arm to the stanchion 60. Although not integral to the operation of the configuration in FIG. 12, an elongated extensible support 76 may be pivotally secured at 78 to an inboard location of the seat back arm 72 above both the latch engaging pin 70 and the stanchion pivot 74, this in order to facilitate smooth forward dumping motion of the seat back without the benefit of a separate cross tube support extending between the inboard and outboard stanchions.

FIGS. 8-12 exhibits a succession of operational views of an alternate embodiment of a trigger and support construction of incorporating the seat back latch mechanism 58 and in which an inboard stanchion 80 is provided and upon which is mounted a pivot lever (see linkage connected levers 82 and 84 on an inboard facing side thereof). As best shown in enlarged FIG. 9, an underneath positioned bracket 86 secures an end of an outer sheath 88, from within which is displaceable a cable 90, an end of which being engaged to an end of the linkage 84. Retraction of the cable 90 (such as resulting from a remote end latch or handle actuation by a user) results in an initial clockwise pivot along arrow 94 to lever 84, this introducing a counter clockwise pivot 95 to associated lever 82, thereby introducing a counter-biasing rotation to an outboard side supported clock spring 96 (see FIG. 10), which can define part of a puck mounted subassembly secured to the stanchion 80 and an inboard located seatback arm 98.

A cross tube 100 extends between a rotational center of the inboard mounted clock spring 96 and an inboard facing side of the outboard located stanchion 60 (such as further pivotally connecting to a pivot recliner release location as will be subsequently described). In this fashion, retraction of the cable 90 results in simultaneous triggered release of both inboard 98 and outboard 102 located seatback arms.

Figure 8:
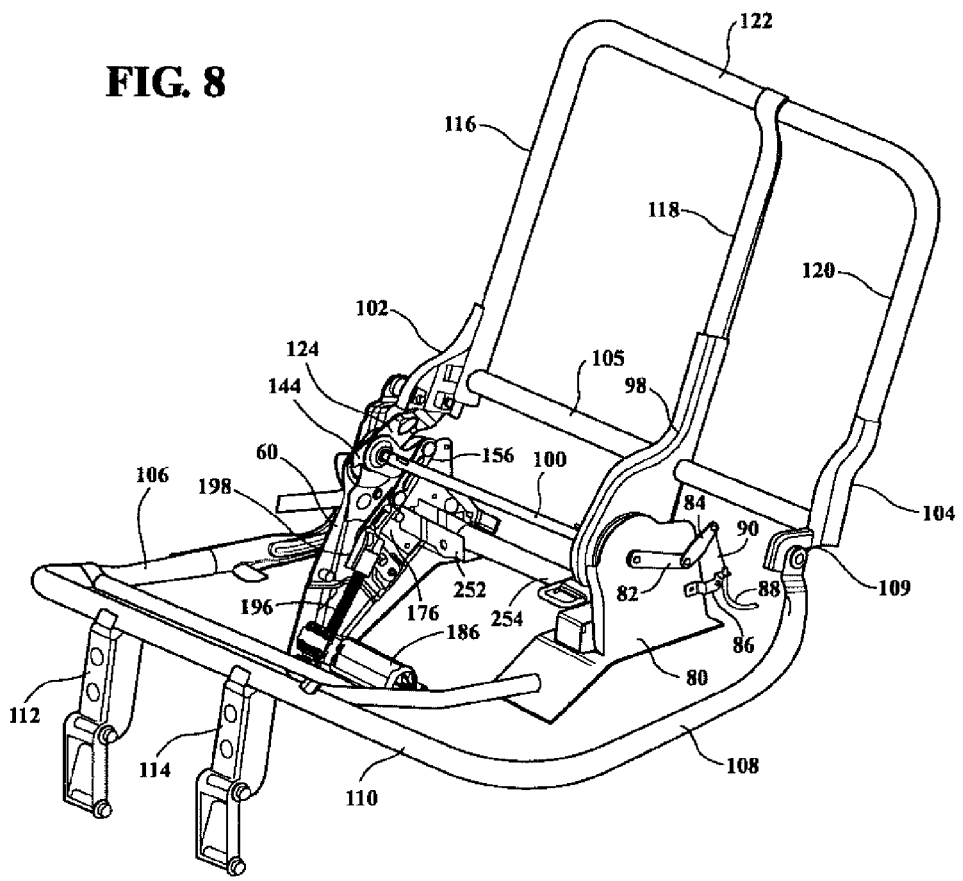
FIG. 8 is an operational view of seat back latch mechanism according to a further preferred embodiment and in which an inboard stanchion supported lever and spring driven cross tube mechanism is provided for influencing forward seat back dump.
Figure 10:
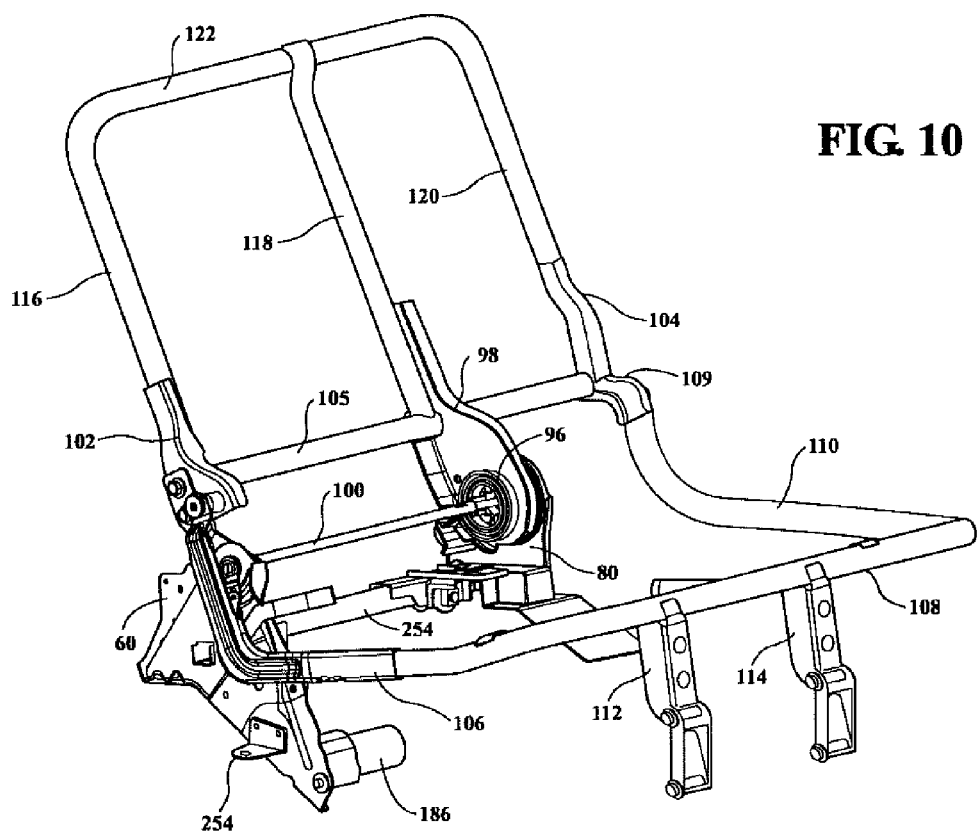
FIG. 10 is a rotated perspective of the mechanism of FIG. 8 and depicting the inboard stanchion mounted clock spring for driving the seat back arms forward to the trigger released and forward dump position.
Figure 11:
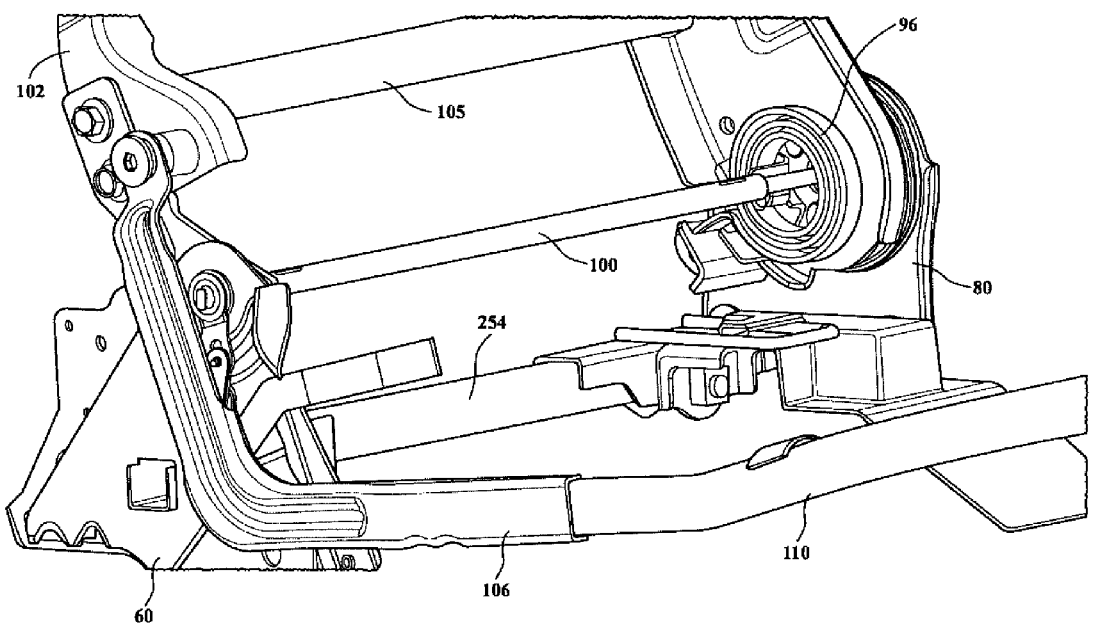
FIG. 11 is an enlarged illustration of the mechanism of FIG. 10.

As further best depicted in FIGS. 8 and 10, the seat frame construction depicted can include additional inboard spaced supporting structure, not limited to the provision of an inboard side located pivot arm 104. Relevant components associated with the seat bottom frame further include sides 106 and 108 extending from outboard 60 and inboard (further at 109) stanchion support locations. An interconnected front 110 of the seat bottom frame is (typically releasably) secured upon a floor (not shown) of the vehicle by a pair of bottom extending foundation pillars 112 and 114 and defines a profile for integrating a seat bottom cushion. Additional interconnecting seat back frame defining components are further shown at 116, 118 and 120 from outboard to inboard spaced locations extending upwardly from their respective support arms 102, 98 and 104 (these further being structurally interconnected via a cross extending support 105), with a further top extending and interconnecting frame 122 provided for defining an overall profile for integrating the seatback cushion.

Given the above supporting description, and referencing again FIGS. 4-8, a more detailed description of the mechanism 58 will now be provided and which is understood to present only one of numerous possible linkage driven configurations which are alternate to that originally depicted at 10 in FIGS. 1-3 and which provide the combined features of manually triggered seat back forward dump, with subsequent motorized rewinding of the seat back arm and final resetting of the linkage to the initial design position, this in further anticipation of a future dump cycle.

Figure 9:
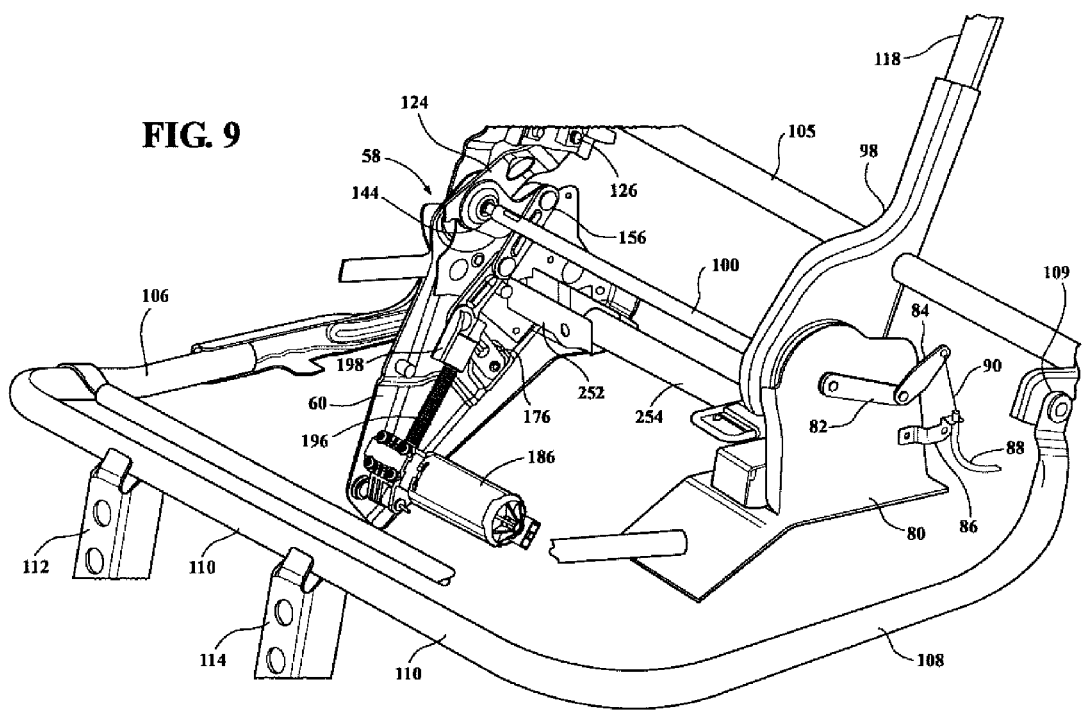
FIG. 9 is an enlarged illustration of the mechanism of FIG. 8 and illustrating the engagement of the cross tube with the recliner release pivot associated with the outboard located stanchion.

An arm 124 is shown and engages, at 126, an inside location of the upright extending frame support 102 (see FIGS. 8-9). The arm 14 includes an intermediate bend (see as shown at 127 in FIG. 4) in order to provide adequate clearance from the upper pivotally supported end of the stanchion 60. A pair of apertures are defined by inner perimeter surfaces 128 and 130 and which receive fasteners such as again shown at 126 for mounting the arm 124 to the upper support 102.

A lower inner perimeter rim 132 defines a pivot location and which receives a main pivot weld nut 134 in order to mount the arm 124 to pivot aperture 136 established near the top end of the stanchion 60. A bottom arcuate surface 138 of the arm 124 is established in a substantially outer concentric fashion about the pivot defining rim 132 and which terminates in a projection 140 establishing an abutment shoulder 142.

Figure 6:
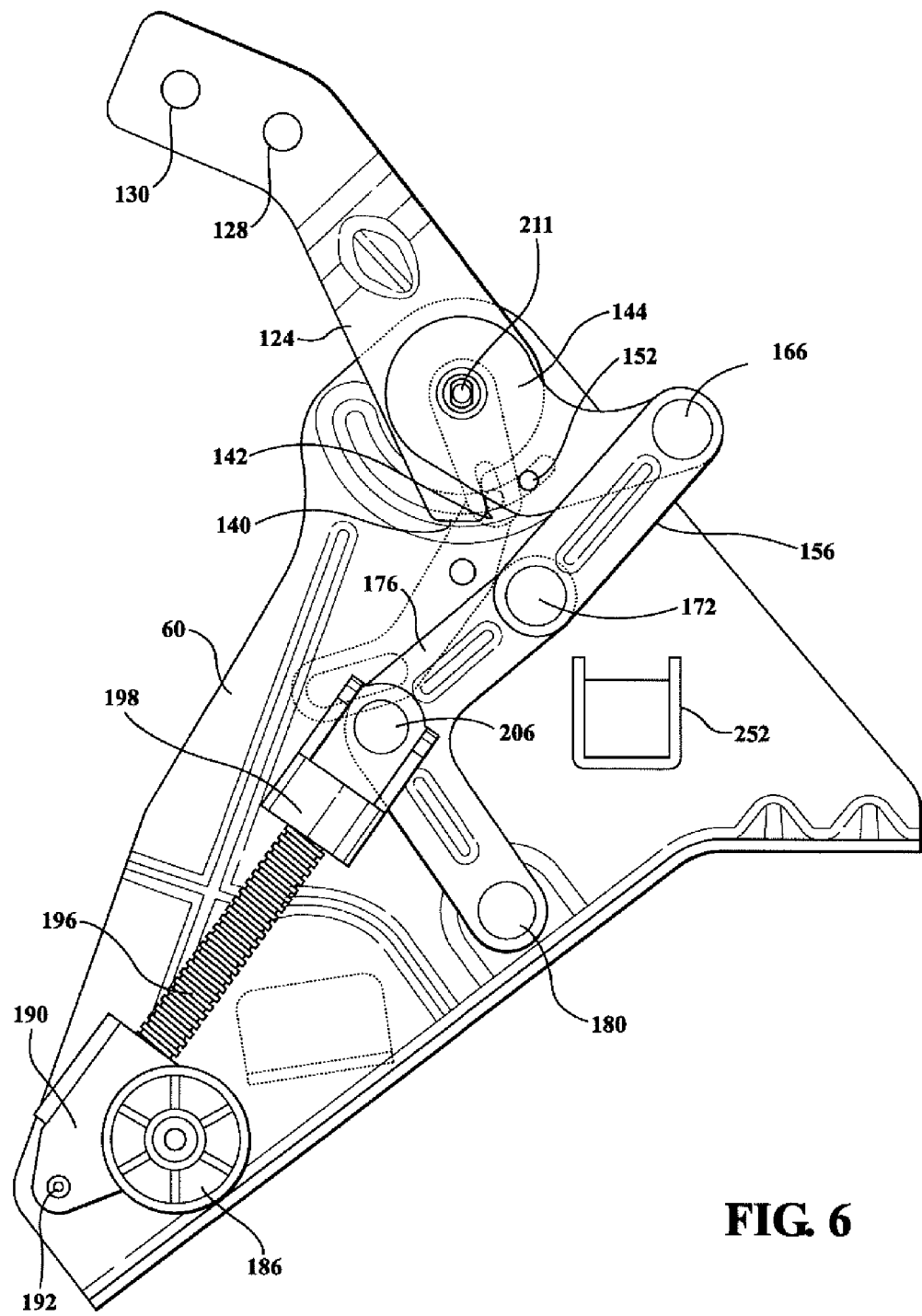
FIG. 6 is a succeeding illustration of the seatback in a manually triggered and forward dump position.
Figure 7:
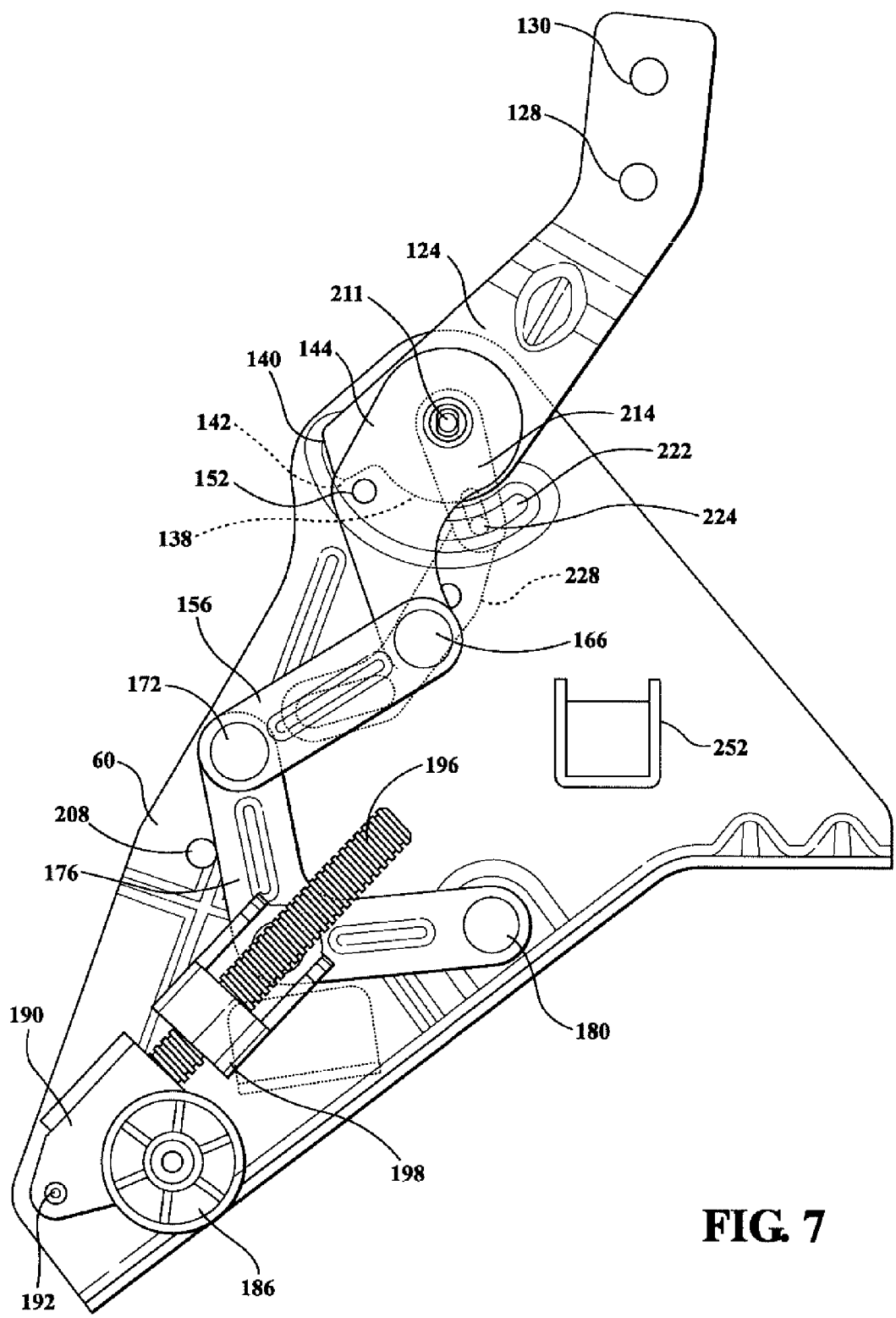
FIG. 7 is a further succeeding illustration of a motor rewind mechanism for returning the seatback to the upright design position, via a linkage driven pawl with engaging pin for influencing the seat back arm, following which the articulating drive linkage interconnecting the motor to the seatback engaged member is retracted to the initial upright design position.

A linkage for establishing motorized rewinding of the seat back arm 124 includes a sector 144 exhibiting a substantially flattened profile and having a rounded portion defining an outer edge profile 146 concentrically arranged about an inner perimeter rim 148, this in turn establishing a coaxial mounting location with the pivot defining rim 132 of the seatback arm 124. A compressible wave washer 150 is depicted and which coaxially aligns between the pivot defining locations of the arm 124 and sector 144. Also depicted is a return motion inducing pin 152 which engages a rim defining mounting aperture 154 at a lower proximate edge location of the sector 144, this in order to mount the pin 152 in an extending manner which aligns within an arcuate profile defined around the arcuate surface 138 arm until establishing an end rotated engagement with the abutment shoulder 142 (FIGS. 6-7).

A link 156 is shown exhibiting an elongate, flattened and linear profile and which includes a first end proximate and inner rim defining aperture 158 for pivotally mounting to a further rim defining aperture 160 associated with an extending end portion 162 of the sector 144. A bushing 164 and pivot pin 166 is provided for pivotally securing the first end of the link 156 to the extending end location 160 of the sector 144.

The link 156 includes a second end proximate and inner rim defining aperture 168 which is mounted, via a second bushing 170 and pivot pin 172, to a rim defining end location 174 associated with a first leg of a pseudo boomerang shaped second or lower link 176. An opposite second leg end location, defined by a further aperture defining rim 178, receives a lower link pivot 180 engaging through an aperture 182 in the stanchion 60 from an outboard side thereof and over which is seated a further wave washer 184 in sandwiched fashion between the lower link 176 and the stanchion 60, this in order to pivotally interconnect the upper link 156 and lower boomerang link 176 in the manner depicted in each of FIGS. 5-7.

An electric motor 186 is provided which exhibits a generally cylindrically configured housing and which is mounted, via a receiving sleeve 188 defined at a base mounting end 190 of the motor, in an inboard extending direction from a lower end location of the stanchion 60. An elongated pin 192 engages from an outboard side of the stanchion 60, through aligning aperture 194 in the stanchion 60, and into the sleeve 188 in order to mount the motor 186 in a limited pivotal fashion to the lower proximate end of the stanchion 60.

A rotatably driven screw 196 is illustrated extending in a crosswise fashion from the base mounting end 190 of the motor housing. The screw 196 terminates in an end mounted nut drive 198 with edge extending bracket 200, through which is defined an inner aperture 202 aligned with a middle aperture 204 established in the lower boomerang shaped link 176 and pivotally mounted thereto via a motor associated rivet 206.

A stop pin 208 is provided and is mounted to the inboard side of the stanchion 60 (via aperture 210) and which defines a forward abutting stop location (see FIG. 7) associated with an end of a first (upright) retraction of the seat back arm 124 to the upright position. Additional features include a recliner release pivot 211, the inboard extending end of which is received within an open end of the cross tube 100 as best shown in FIG. 8, and with an outboard extending portion projecting through a further washer 212 and the aligning rim defining apertures 148 (sector 144), washer 150 and seat back pivot rim 132 and engaging the main pivot 134 located on the outboard side of the stanchion 60.

Additional to the linkage associated with the inboard stanchion 80 depicted in FIGS. 8-11, additional linkage structure is associated with the outboard side of the stanchion 60 and which cooperates with the rotating motion imparted by the cross tube 100 in order to effectuate initial spring loaded and forward release dumping of the seatback 124. This includes an outboard stanchion side located lever 214 which is coaxially mounted, via a keyed end aperture 216 and inter-sandwiched spacer 218, in alignment with the upper end located pivot defining rim aperture 136 in the stanchion 60 and so that a like keyed end profile 220 of the recliner release pivot 211 seats into and slaves the lever 214 in rotating fashion to the counter spring bias influence of the cross tube 100.

An arcuate ("smiley face") recess or track is exhibited by inner perimeter rim 222 defined concentrically below the pivot aperture 136. A further pin 224 is secured in linear adjustable fashion within a slot 226 defined along a lower extending end of the lever 214 and so that the pin 224 extends through the arcuate rim 222 of the stanchion 60, this at a location to permit the pin 224 to engage the inside ledge defining surface 142 of the lower arm projection 140 (in the upright position).

A further lever handle 228 is pivotally mounted to the outboard side of the stanchion 60, this via an arrangement of mounting pivot 230 for engaging aperture 232 in the stanchion and which also coaxially mounts an aperture 234 defined in an upper proximate end of the lever 228. A torsion spring 236 is mounted over the mounting pivot 230 for securing the lever handle 228 in alignment with its pivot rim 234. A washer 237 is located on a reverse (outboard) face of the lever handle 228 is engaged to the pivot 230.

The spring 236 includes an upper hook end 238 which engages the pin 224, as well as a lower hook end 240 which engages a fixed location on the outboard side of the stanchion 60, such as a projecting end of a mounting pin 242 which engages through a stanchion aperture 244. The pin 224 engages a top end located aperture 243 in the lever handle 228 and, in combination with the biasing aspect of the torsion spring 236, creates a counter spring-loaded bias to the outboard facing surface of the stanchion 60.

A strap or the like 244 is provided and includes a rivet end 246 slidably mounted along a track 248 arranged along a lower extending portion of the lever handle 228. Alternate to the inboard stanchion 80 induced seat back dump originated by the cable 90 acting upon the linkage 82/84 (see again FIG. 9), a separate outboard side latch protocol for releasing the seat back arm 124 includes the strap 244 being actuated in an outward direction (see direction arrow 250), the result of which is that the lever handle 228 is first rotated in the ccw direction, thus imparting a cw rotation to the lever 214, at which the pin 224 is unseated from the ledge 142 and the clock spring induced motion of the cross tube 100 drives the seat back arm 124 to the forward dump location (FIG. 6). Other features include a cross car brace 252 (associated with either of the 60/40 outboard seat assemblies) and which in turn would engage an further cross tube 254 (FIGS. 8-11) extending between the outboard 60 and inboard 80 stanchions. A bracket mount 254 is also shown which is secured to the reverse face of the stanchion at a location to assist in the operation of the lever.

Figure 5:
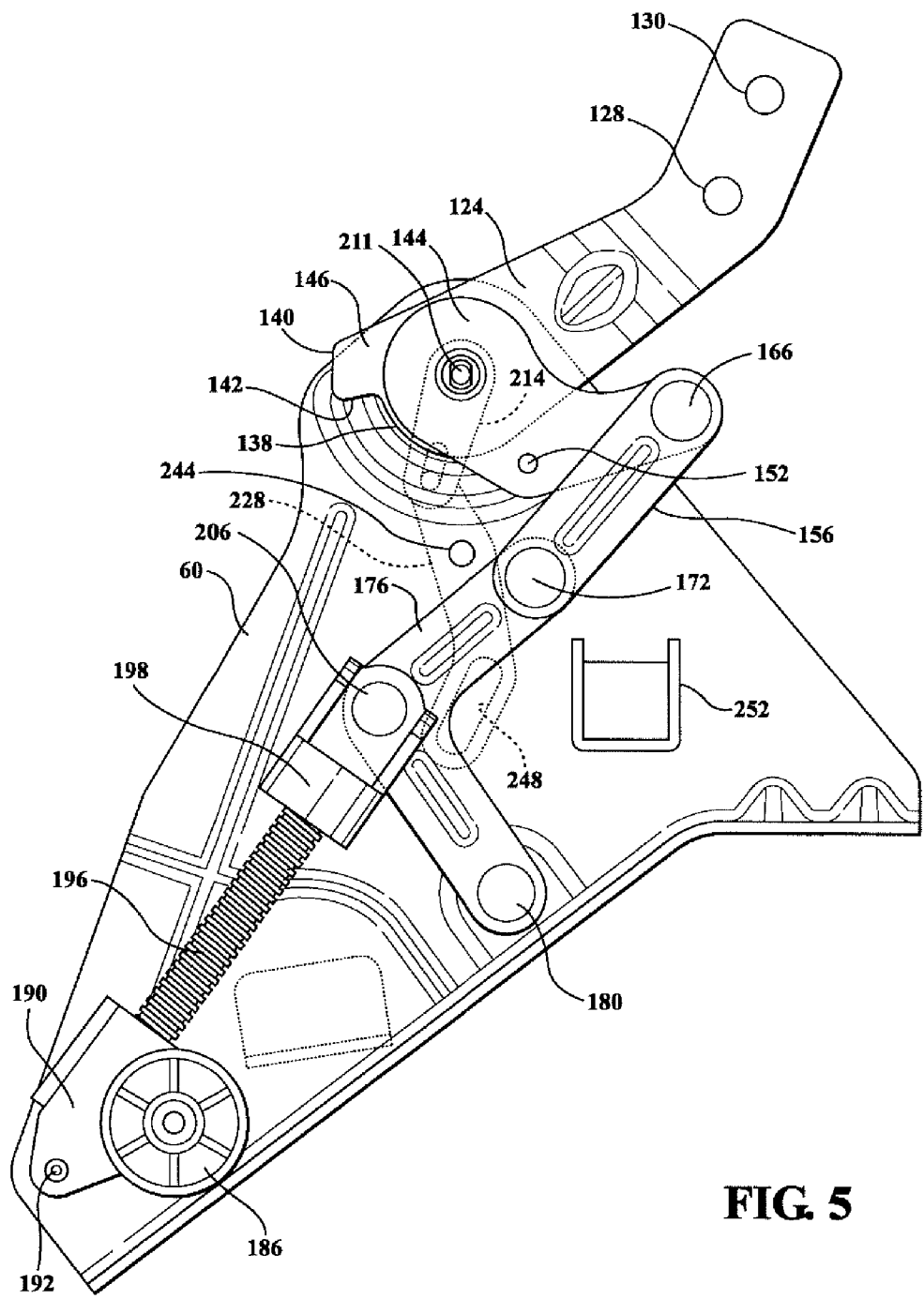
FIG. 5 is a plan view of the latch mechanism of FIG. 4 in which the seatback is shown in an upright design position.

In operation, and upon unlatching the lever 214 actuating pin 224 away from ledge 142 of the seat back arm 124, the seat back arm is permitted to forwardly rotate until the ledge 142 contacts the pin 152 secured to the sector 144 in the location depicted in each of FIGS. 5-6. At this point, the motor 186 activates rotation of the drive screw 196, the result of which is the nut drive 198 descends along the spiral toothed profile to a location proximate its pivotal mounting base 190. Simultaneously, the lower boomerang shaped link 176 pivots in a ccw direction, thus drawing the upper link 156 downwardly and, in turn, rotating the sector 144 in a like fashion so that the pin 152 forcibly rotates the seat back arm 124 upwardly until the arm is reset in the upright design position of FIG. 7 (via reengagement with the pin 224 of the outboard lever 214).

Following reengagement of the seat back arm 124 to the outboard lever 214, the motor 186 return rotates the drive screw 196 such that the nut drive 198 return ascends along the screw, with the associated drive linkage (i.e. links 176, 156 and sector 144) being reset to the initial upright design position of FIG. 5.

Figure 13:
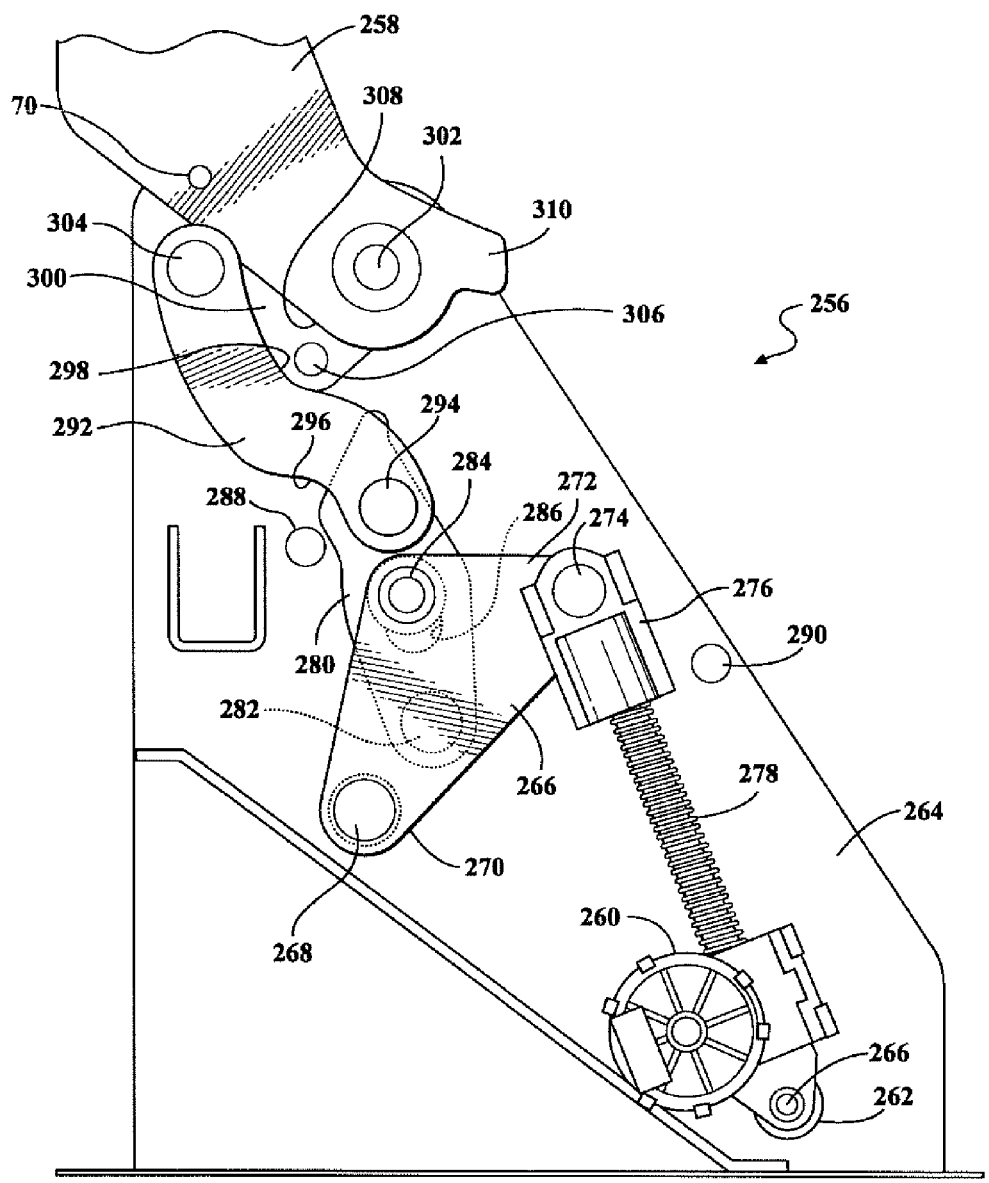
FIG. 13 is a plan view of a third embodiment of a latch mechanism in which the seatback is shown in an upright design position.
Figure 14:
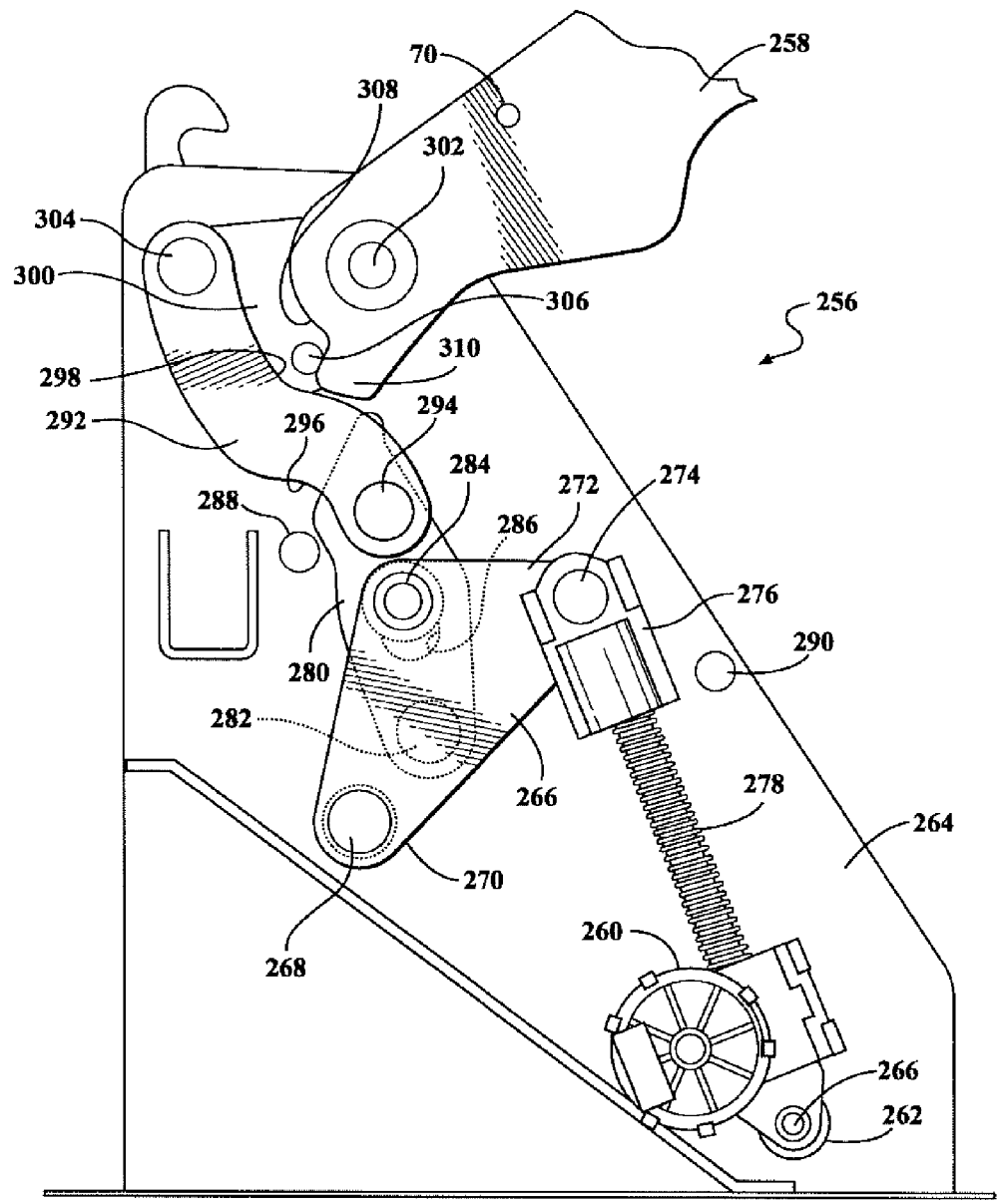
FIG. 14 is a succeeding illustration to FIG. 13 of the seatback in a manually triggered and forward dump position.
Figure 15:
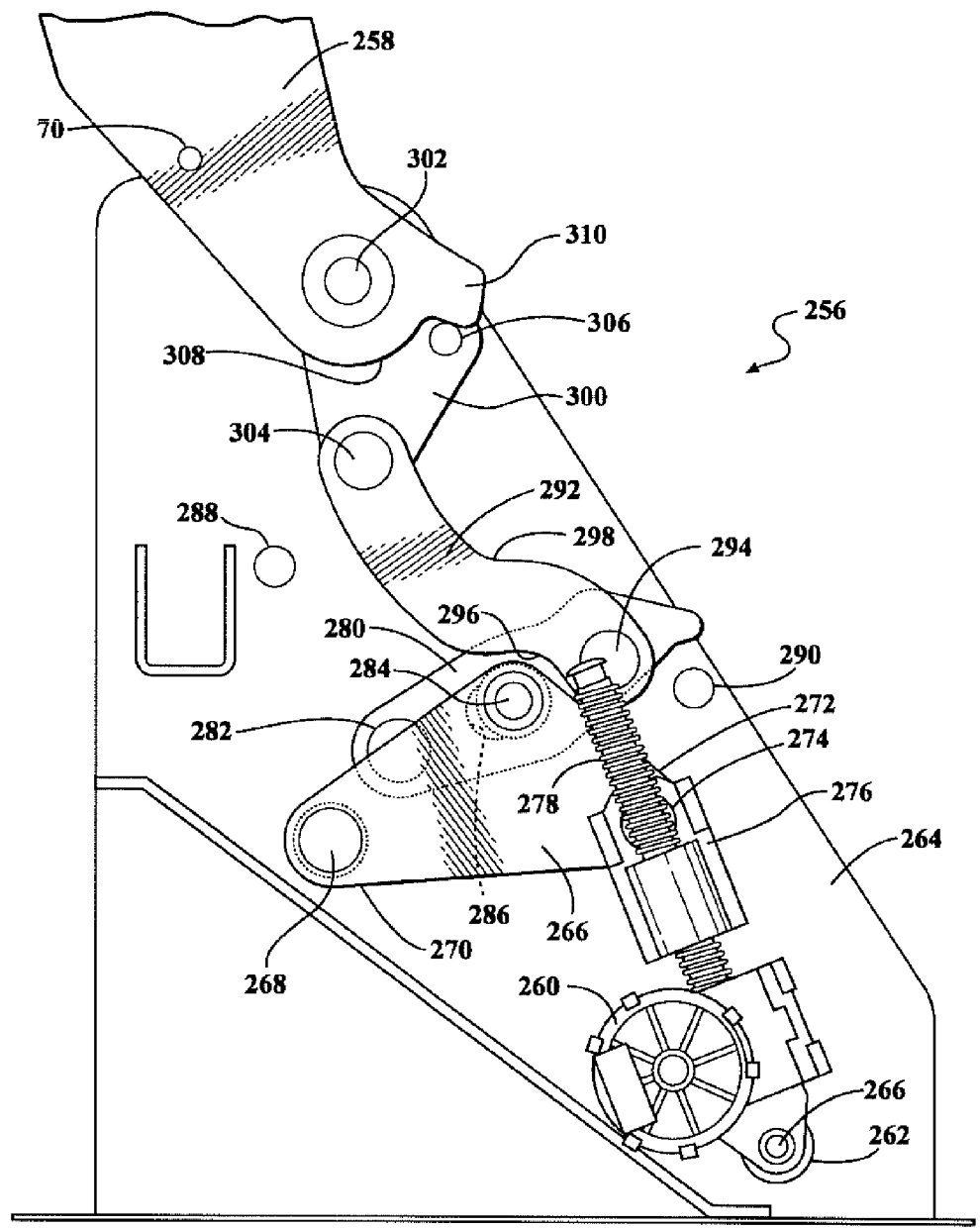
FIG. 15 is a further succeeding illustration of the motor rewind mechanism incorporated into the linkage subassembly of FIG. 13 being engaged in a first travel direction for returning the seatback to the upright design position.
Figure 16:
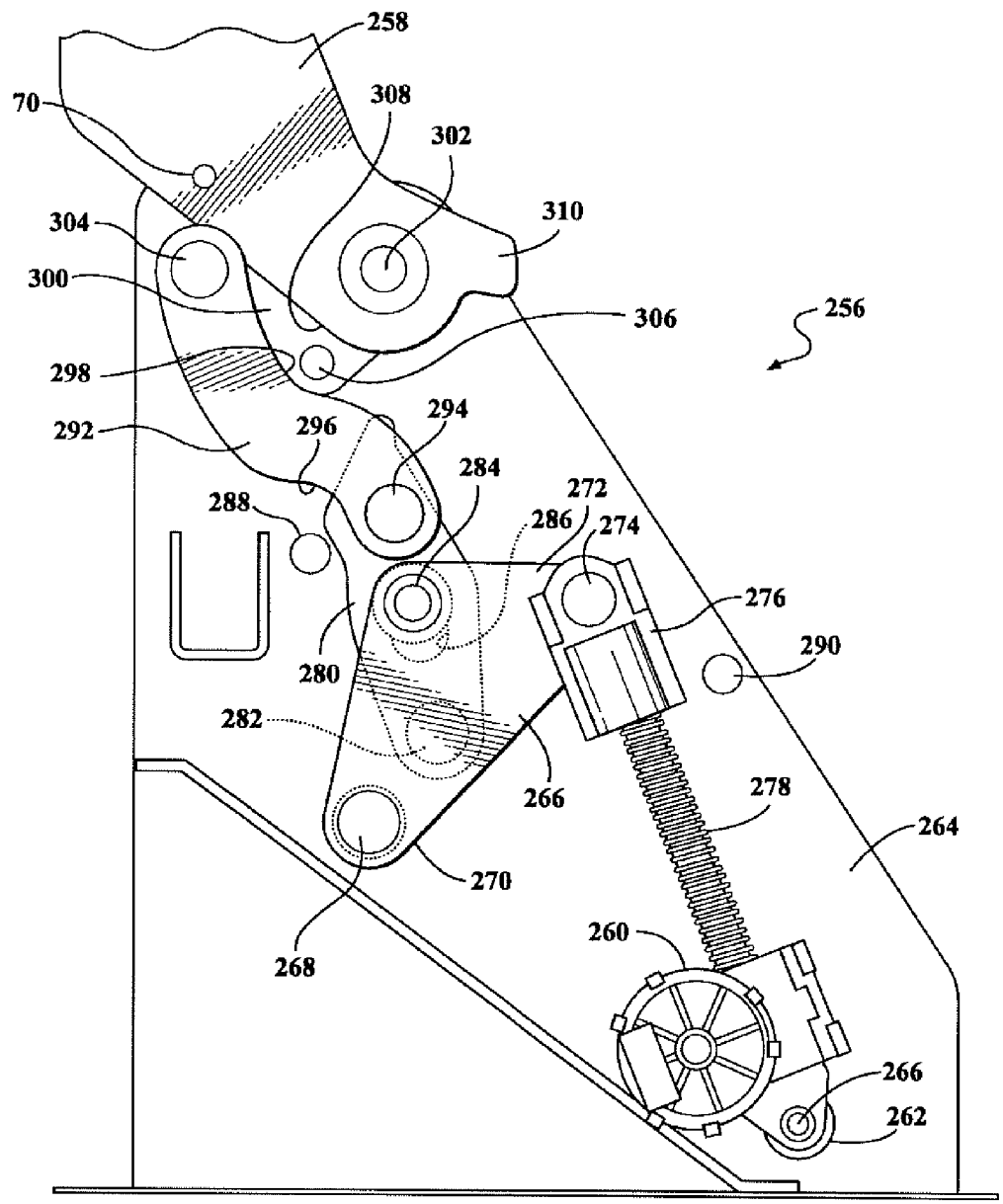
FIG. 16 is a final reset position substantially identical to the upright design position of FIG. 13 and in which travel direction of the motor is reversed in order to reset the linkage subassembly of FIG. 13.

Referring finally to FIGS. 13-16, a series of plan views are shown, see generally at 256 in FIG. 13, of a third embodiment of a seat latch assembly incorporating a yet further reconfigured linkage subassembly. These include, in succession, each of upright design (FIG. 13), manually forward triggered seatback dump (FIG. 14), motor rewind in first travel direction (FIG. 15) and, finally motor reset to second travel direction (FIG. 16 corresponding to FIG. 13).

The latch assembly 256 is understood to correspond in operation to each of those previously described in the variants of FIGS. 1 and 4 such that much of the preceding description is again referenced without repetition here. The linkage subassembly is reconfigured in pivotally interconnecting fashion between the seatback arm or sector 258 and the motor drive, see pivotally supported housing 260 associated with lowermost pivotal mounting location 262 of stanchion support 264.

A first triangular shaped linkage member 266, such as consistent with all of the linkage members described in the previous embodiments, exhibits a generally thin and planar cross sectional profile and is mounted at an intermediate location of the stanchion support 264 via a pin or rivet 268 secured through a first corner location 270 (this generally corresponding to a first acute angular edge profile of the first member 266). A second (likewise acute angular edge profile) corner location 272 of the triangular shaped linkage member 266 receives a pin 274 extending from the inner facing side of a traversable and interiorly threaded collar 276 associated with a rotatably driven motor shaft 278.

A second linkage member 280 exhibits a generally elongate profile and is pivotally mounted (see at phantom at 282) to the stanchion support 264 at a location underneath and obscured by the triangular shaped member 266, such that a portion of the second linkage member 280 projects above a third corner (obtuse angle) corner location 284 of the triangular shaped member 166. The second linkage member 280 exhibits a widened and partial slot defining interior aperture (see inner perimeter wall 286 depicted in phantom) which overlapped by the third corner profile 284 of the triangular shaped linkage member 266.

A pivotal range of motion associated with the second linkage member 280, upon being exerted by the motor 260 and inter-connected first triangular member 266, is established between a first stanchion engaged stop pin 288 abutting the second member 280 at an upright design position of the associated seatback arm 258 (see each of FIGS. 13 and 16), a second stop pin 290 abutting the (pivoting) second member 280 at an end cycle location of a pivoting/upright rewinding of the seatback arm 258 (see further at FIG. 15).

A third elongated linkage member 292 is pivotally and rotatably interconnected to an uppermost location of the second member, such as by a further rivet or pin 294. The profile of the third elongated member is such that it exhibits first and second reverse arcuate portions, these exhibited by opposing edge contours at 296 and 298, respectively, and in order to avoid contacting the first stop pin 288 during the seat back rewind and linkage reset positions.

An upper most and generally triangular shaped sector 300 defines a fourth linkage member and which is coaxially pivotal relative to the seatback arm or sector 258 via a pin or rivet 302 extending through the seatback sector and a first corner location of the fourth member. The third elongate member 292 links to the fourth member 300 via a further pin or rivet 304 that inter-pivotally engages a second corner location of the fourth member 300 to an upper end proximate location of the third member 292.

A further stop/drive pin 306 projects outwardly from a third and generally lower most corner location of the fourth member 300 located below an arcuate bottom edge profile (at 308) of the seatback sector 258 and such that, in a first triggered forward dumping rotation of the seatback, the pin 306 defines a forward most permitted angular rotation of the seatback upon being abutted by a projecting shoulder portion 310 of the seatback sector associated with a location of its arcuate bottom profile 208. Initial triggering of the seatback 258 to the forward dump position (FIG. 14) reveals the reverse stanchion face supported latch with hook end 68 previously shown and described in FIG. 12, releasing from pin generally depicted at 70 in FIG. 13 and, as is also shown in FIG. 12, is located on a reverse face of thee seatback arm. It is again understood that the triggered release of the seatback sector can be accomplished by any number of one non-limiting examples of suitable latching structure, such as again alternately including the provision of triggering latching structure incorporated into an opposite (inboard) stanchion such as shown at 80 in FIGS. 8-11 for triggering seatback 102 dump via the spring loaded cross tube 100.

The pin 306 then subsequently functions in a driving/rewind capacity against the projecting ledge or shoulder 310 of the seatback sector 258, upon the motor drive shaft 278 being rotated in the first upright rewind cycle, this again causing the collar 276 to descend inwardly along the shaft 278 (see FIG. 15) and in order to influence the interconnecting linkage members 266, 280, 292 and 300 to upwardly reset the seatback sector 258 to the design position. As with the previously described variants, the threaded motor shaft is then driven in a reverse direction, causing the collar to travel in a reverse/outward direction along the shaft and the linkage members to reset to their original position (FIG. 16 consistent with FIG. 13).

Having described my invention, other additional preferred embodiments will become apparent to those skilled in the art to which it pertains, and without deviating from the scope of the appended claims.

The invention claimed is:

1. A seat latch assembly for providing manual triggering and subsequent powered rewinding of a seatback, comprising:
    a stanchion support secured to a floor location of a vehicle frame;
    a seatback sector pivotally supported at an elevated location of said support, said sector defining a side extending portion of a seatback frame;
    a linkage assembly having a plurality of first, second, third and fourth pivotally inter-linking members arranged upon said stanchion support between a lower most positioned motor drive and a projecting shoulder associated with an arcuate bottom edge profile of said sector; and
    upon a separately triggered forward dump of the seatback, said motor drive influencing said linkage assembly to upwardly reset said seatback to an upright position.

2. The seat latch assembly as described in claim 1, said linkage assembly further comprising a first triangular shaped linkage member exhibiting a generally thin and planar cross sectional profile and which is pivotally mounted through a first acute angled corner of said first linkage member, to an intermediate location of said stanchion support, a second acute angled corner of said first triangular shaped linkage member receiving a pin extending from the inner facing side of a traversable and interiorly threaded collar associated with an exteriorly threaded and rotatably driven shaft of said motor drive.

3. The seat latch assembly as described in claim 2, said linkage assembly further comprising a second linkage member exhibiting a generally elongate profile and which is pivotally mounted to said stanchion support at a location underneath and obscured by said first triangular shaped linkage member, such that a portion of said second linkage member projects above a third obtuse angled corner of said first triangular shaped member, second linkage member exhibiting a widened and partial slot defining interior aperture which is overlapped by said third corner of said first triangular shaped linkage member.

4. The seat latch assembly as described in claim 3, further comprising a pivotal range of motion associated with said second linkage member, upon being actuated by said motor and said inter-connected first triangular shaped linkage member, established between a first stanchion engaged stop pin abutting said second linkage member at an upright design position of said seatback sector, and a second stop pin abutting said second linkage member at an end cycle location of a pivoting/upright rewinding of said seatback sector.

5. The seat latch assembly as described in claim 4, further comprising a third elongated linkage member pivotally and rotatably interconnected to an uppermost location of said second member, a profile of said third elongated member being such that it exhibits first and second reverse arcuate portions in order to avoid contacting said first stop pin during seatback rewind and linkage reset positions.

6. The seat latch assembly as described in claim 5, further comprising an upper most and generally triangular shaped sector defining a fourth linkage member and which is coaxially pivotal relative to said seatback sector at a first corner location of said fourth linkage member, said third elongate linkage member inter-pivotally linking to said fourth linkage member at a second corner location of said fourth member aligning with an upper end proximate location of said third member.

7. The seat latch assembly as described in claim 6, further comprising a further stop/drive pin projecting outwardly from a third and generally lower most corner location of said fourth linkage member located below said arcuate bottom edge profile of said seatback sector and such that, in a first triggered forward dumping rotation of the seatback, said stop/drive pin defines a forward most permitted angular rotation of the seatback upon being abutted by said projecting shoulder.

8. The seat latch assembly as described in claim 1, said motor drive further comprising an electric motor assembly mounted to a lower end location of said stanchion support proximate an angled bottom.

9. The seat latch assembly as described in claim 8, further comprising an obstruction sensor incorporated into said motor for reversing a driving direction in the event of an obstruction being detected during resetting to the upright design position.

10. The seat latch assembly as described in claim 1, further comprising a spring loaded lever secured to a reverse face of said stanchion support, actuation of an extending end of said lever releasing an engaging pin associated with said seat sector to permit triggering to the forward dump position.

11. The seat latch assembly as described in claim 1, said stanchion support further comprising a first outboard stanchion, a second spaced apart inboard stanchion having a second pivotally supported seatback sector and being interconnected to said outboard stanchion by a rotatable cross tube, a clock spring being supported on an outboard facing side of said inboard stanchion and so that, upon being actuated by a pair of cable actuated and linkage connected levers arranged on an inboard side, rotation of said cross tube actuating said lever and pin of said first stanchion in order to trigger forward dump of said seat back arms.

12. An assembly for providing manual triggering and subsequent powered rewinding of a seatback relative to a seat bottom, comprising:
- a first outboard stanchion secured to a floor location of a vehicle frame;
- a spring loaded seatback sector forming a portion of a seatback and which is pivotally secured to said first stanchion and retained by a lever and pin mounted to said stanchion in a counter biased and upright position;
- a motor engaging a first linkage member associated with a plurality of four inter-linking members supported upon said first stanchion and inter-connecting said motor to said seatback sector, said motor being activated in a first direction for return rewinding the seatback to a design position and following a previous forward released rotation of the seatback to a dump position, said motor resetting said linkage in a second reverse actuating direction following reengagement of said seatback sector with said lever and pin; and
- a second spaced apart inboard stanchion having a second pivotally supported seatback sector and being interconnected to said outboard stanchion by a rotatable cross tube, a clock spring being supported on an outboard facing side of said inboard stanchion and so that, upon being actuated by a pair of cable actuated and linkage connected levers arranged on an inboard side, rotation of said cross tube actuating said lever and pin in order to trigger forward dump of said seatback defining sectors.

13. The seat latch assembly as described in claim 12, said first linkage member of said linkage assembly further comprising a triangular shaped linkage member exhibiting a generally thin and planar cross sectional profile and which is pivotally mounted through a first acute angled corner of said first linkage member, to an intermediate location of said stanchion support, a second acute angled corner of said first triangular shaped linkage member receiving a pin extending from the inner facing side of a traversable and interiorly threaded collar associated with an exteriorly threaded and rotatably driven shaft of said motor drive.

14. The seat latch assembly as described in claim 13, said linkage assembly further comprising a second linkage member exhibiting a generally elongate profile and which is pivotally mounted to said stanchion support at a location underneath and obscured by said first triangular shaped linkage member, such that a portion of said second linkage member projects above a third obtuse angled corner of said first triangular shaped member, second linkage member exhibiting a widened and partial slot defining interior aperture which is overlapped by said third corner of said first triangular shaped linkage member.

15. The seat latch assembly as described in claim 14, further comprising a pivotal range of motion associated with said second linkage member, upon being actuated by said motor and said inter-connected first triangular shaped linkage member, established between a first stanchion engaged stop pin abutting said second linkage member at an upright design position of said seatback sector, and a second stop pin abutting said second linkage member at an end cycle location of a pivoting/upright rewinding of said seatback sector.

16. The seat latch assembly as described in claim 15, further comprising a third elongated linkage member pivotally and rotatably interconnected to an uppermost location of said second member, a profile of said third elongated member being such that it exhibits first and second reverse arcuate portions in order to avoid contacting said first stop pin during seatback rewind and linkage reset positions.

17. The seat latch assembly as described in claim 16, further comprising an upper most and generally triangular shaped sector defining a fourth linkage member and which is coaxially pivotal relative to said seatback sector at a first corner location of said fourth linkage member, said third elongate linkage member inter-pivotally linking to said fourth linkage member at a second corner location of said fourth member aligning with an upper end proximate location of said third member.

18. The seat latch assembly as described in claim 17, further comprising a further stop/drive pin projecting outwardly from a third and generally lower most corner location of said fourth linkage member located below said arcuate bottom edge profile of said seatback sector and such that, in a first triggered forward dumping rotation of the seatback, said stop/drive pin defines a forward most permitted angular rotation of the seatback upon being abutted by said projecting shoulder.

19. The seat latch assembly as described in claim 12, said motor further comprising an electric motor assembly pivotally mounted to a lower end location of said stanchion support proximate an angled bottom.

20. A seatback latch assembly, comprising:
- a first outboard stanchion secured to a floor location of a vehicle frame;
- a seatback sector forming a portion of a seatback pivotally secured to said first stanchion and retained in a counter biased and upright position;
- a plurality of first, second, third and fourth interconnecting linkage members arranged upon said stanchion support between a lower most positioned motor drive and a projecting shoulder associated with an arcuate bottom edge profile of said sector;
- a second spaced apart inboard stanchion secured to a further floor location of the vehicle frame and pivotally supporting a second seatback sector;
- a rotatable cross tube interconnecting said inboard and outboard stanchions, a clock spring being supported on an outboard facing side of said inboard stanchion and, upon being actuated by a lever arranged on an inboard side, rotation of said cross tube actuating said first stanchion supported seatback sector in order to trigger forward dump of the seatback; and
- said motor drive being actuated in a first direction to upwardly retract the seatback to the upright position, said motor drive subsequently being actuated in a second direction to reset said linkage members.

* * * * *